United States Patent Office 3,235,364
Patented Feb. 15, 1966

3,235,364
STIMULATING PLANT GROWTH
Sanford M. Siegel, White Plains, N.Y., assignor to Union Carbide Corporation, a corporation of New York
No Drawing. Filed Nov. 20, 1962, Ser. No. 239,062
15 Claims. (Cl. 71—2.5)

This application is a continuation-in-part of my application Serial No. 154,898, filed November 24, 1961, now abandoned.

This invention relates to treatment of biological systems. More particularly, this invention relates to growth regulation of plants.

A variety of materials have been suggested in the art as growth regulators for plants. These can be generally classified into two groupings (1) growth inhibitors such as weed killers, germination inhibitors, and the like and (2) growth stimulants such as fertilizers and plant hormones. The present invention is directed to particular novel methods for plant growth stimulation.

The presently known plant growth stimulants have had greater or lesser success in practice depending on the particular compound employed and have exhibited considerable variation in their effects on various plants. In addition, in the case of growth stimulants of the fertilizer type, larger and cumbersome amounts have to be applied to the plant before the beneficial effects become apparent.

An object of the present invention is to provide a novel method for stimulating plant growth.

Another object of this invention is to provide a method for promoting the general vegetative development of a plant.

Still another object is to provide a method for promoting the flowering of a plant.

A further object is to provide a method for enhancing the germination of seeds.

These and other objects will become readily apparent upon reference to the ensuing discussion and the appended claims.

The present invention contemplates a method whereby a number of a particular group of organic compounds is applied to the plant or selected portions thereof in an amount sufficient to enhance the rate of development. Organic compounds within the purview of this invention are those which are:

(1) Stable in acidic media;
(2) Characterized by the presence of a vinyloxy group; and
(3) Selected from the group which includes alkyl vinyl ether, substituted alkyl vinyl ether, aryl vinyl ether, substituted aryl vinyl ether, and benzofuran.

It is a necessary prerequisite for the present invention that the stimulant compounds are stable in acidic media. This requirement is dictated by the fact that plant systems are acidic in nature, usually having a pH in the range from about 5.5 to about 6.5.

The term "vinyloxy group" as used herein and in the appended claims characterizes a grouping of two carbon atoms bonded with a double bond, one of said carbon atoms being further bonded with a single bond to an adjacent oxygen atom. The group can also be described as a vinyl or vinylene radical attached to an oxygen atom.

The alkyl vinyl ethers contemplated herein include those containing up to 18 carbon atoms in the alkyl radical. Illustrative alkyl radicals are methyl, ethyl, n-propyl, iso-propyl, n-butyl, sec-butyl, t-butyl, the amyls, the hexyls, the heptyls, the octyls, the dodecyls, the octadecyls, cyclopentyl, cyclohexyl, cycloheptyl, and the like.

For seedling growth, seed germination, and general vegetative development preferred are the aforesaid alkyl vinyl ethers containing less than eight carbon atoms in the alkyl radical.

The substituted alkyl vinyl ethers contemplated herein include the aralkyl vinyl ethers, the haloalkyl vinyl ethers, the haloaralkyl vinyl ethers, the alkoxyalkyl vinyl ethers, the alkthioalkyl vinyl ethers, the arylthioalkyl vinyl ethers, the dialkaminoalkoxyalkyl vinyl ethers, the aryloxyalkyl vinyl ethers, the halogenated aryloxyalkyl vinyl ethers, the hydroxyalkoxyalkyl vinyl ethers, and the like, containing up to eighteen carbon atoms in the substituted alkyl radical.

Particularly preferred for seedling growth, seed germination, and general vegetative development are the haloalkyl vinyl ethers containing less than eight carbon atoms in the haloalkyl radical.

For the promotion of flowering and fruiting the alkthioalkyl vinyl ethers, the dialkaminoalkoxyalkyl vinyl ethers, the halogenated aryloxyalkyl vinyl ethers, and the hydroxyalkoxyalkyl vinyl ethers are preferred. Particularly preferred for this purpose are the alkthioalkyl vinyl ethers containing more than seven carbon atoms in the alkthioalkyl radical.

Illustrative aralkyl vinyl ethers are phenylbutyl vinyl ether, phenylpropyl vinyl ether, phenylmethyl vinyl ether, naphthylbutyl vinyl ether, naphthylpropyl vinyl ether, naphthylmethyl vinyl ether, anthrylbutyl vinyl ether, anthrylpropyl vinyl ether, anthrylmethyl vinyl ether, and the like.

Illustrative haloalkyl vinyl ethers are chloromethyl vinyl ether, dichloromethyl vinyl ether, bromomethyl vinyl ether, dibromomethyl vinyl ether, tribromomethyl vinyl ether, trichloromethyl vinyl ether, the choloropropyl vinyl ethers, the polychloropropyl vinyl ethers, the bromopropyl vinyl ethers, the polybromopropyl vinyl ethers, the polychloroethyl vinyl ethers, the polybromoethyl vinyl ethers, the polychlorobutyl vinyl ethers, and the like.

Illustrative haloaralkyl vinyl ethers are chlorophenylbutyl vinyl ether, the polychlorophenylbutyl vinyl ethers, the polybromophenylbutyl vinyl ethers, the polychlorophenylethyl vinyl ethers, the polychloroanaphthylpropyl vinyl ethers, and the like.

Illustrative alkoxyalkyl vinyl ethers are methoxymethyl vinyl ether, ethoxymethyl vinyl ether, propoxymethyl vinyl ether, methoxyethyl vinyl ether, propoxyethyl vinyl ether, butoxyethyl vinyl ether, methoxypropyl vinyl ether, ethoxypropyl vinyl ether, propoxypropyl vinyl ether, butoxypropyl vinyl ether, butoxybutyl vinyl ether, and the like.

Illustrative alkthioalkyl vinyl ethers are 2-(S-methyl)-ethyl vinyl ether, 2-(S-ethyl)-ethyl vinyl ether, 2-(S-n-propyl)-ethyl vinyl ether, 2-(S-n-butyl)-ethyl vinyl ether, 2-(S-n-hexyl)-ethyl vinyl ether, 2-(S-n-octyl)ethyl vinyl ether, 2-(S-n-dodecyl)-ethyl vinyl ether, 2-(S-n-hexadecyl)-ethyl vinyl ether, 3-(S-n-octyl)-propyl vinyl ether, 4-(S-n-nonyl)-butyl vinyl ether, and the like. In addition, the alkthioalkyl radical of a vinyl ether can also contain up to 10 atoms as a substituted moiety thereof. Illustrative of these are 2-[S-(2'-cyanoethoxy)-ethyl]-ethyl vinyl ether, 2-[S-(2'-cyanopropoxy)-ethyl]-ethyl vinyl ether, and the like.

Illustrative arylthioalkyl vinyl ethers are 2-(S-phenyl)-ethyl vinyl ether, 3-(S-phenyl)-propyl vinyl ether, 2-(S-phenyl)-propyl vinyl ether, 4-(S-naphthyl)-butyl vinyl ether and the like.

Illustrative dialkaminoalkoxylalkyl vinyl ethers are 2-[2'-(N,N-diethylamino)]-ethoxyethyl vinyl ether, 3-N,N-dimethylaminoethoxypropyl vinyl ether, 2-[2'-(N,N-dimethylamino)]propoxybutyl vinyl ether, and the like.

Illustrative aryloxyalkyl vinyl ethers are phenoxymethyl vinyl ether, phenoxyethyl vinyl ether, phenoxypropyl vinyl ether, phenoxybutyl vinyl ether, phenoxyhexyl vinyl ether, and the like. Also contemplated within this grouping are the alkoxy-substituted aryloxyalkyl vinyl ethers such as 2-(3,5-dimethoxyphenoxy)ethyl vinyl ether, 3-(3,5-diethoxyphenoxy)-propyl vinyl ether, and the like.

Illustrative halogenated aryloxyalkyl vinyl ethers are 2-(2,4-dichlorophenoxy)-ethyl vinyl ether, 2-(2,3,5-trichlorophenoxy)-ethyl vinyl ether, 2-(2,4-dibromophenoxy)-ethyl vinyl ether, 3-(2,3,5-tribromophenoxy)-propyl vinyl ether, and the like.

Illustrative hydroxyalkoxyalkyl vinyl ethers are 11-hydroxy-3,6,9-trioxy-undecyl vinyl ether, 5-hydroxy-3-oxyhexyl vinyl ether, 5-hydroxy-3-oxy-4-methyl-hexyl vinyl ether, 7-hydroxy-3-oxy-heptyl vinyl ether, and the like.

The aryl vinyl ethers contemplated herein include phenyl vinyl ether, naphthyl vinyl ether, anthryl vinyl ether, and the like.

The substituted aryl vinyl ethers contemplated herein include the alkaryl vinyl ethers, preferably containing up to six carbon atoms in the alkyl substituents, the haloaryl vinyl ethers, the haloalkaryl vinyl ethers, and the nitroaryl vinyl ethers.

Illustrative alkaryl vinyl ethers are tolyl vinyl ether, xylyl vinyl ether, ethylphenyl vinyl ether, propylphenyl vinyl ether, and the like.

Illustrative haloaryl vinyl ethers are the chlorophenyl vinyl ethers, the bromophenyl vinyl ethers, the polychlorophenyl vinyl ethers, the polybromophenyl vinyl ethers, the polychloronaphthyl vinyl ethers, the polybromonaphthyl vinyl ethers, the chloroanthryl vinyl ethers, the chloroxylyl vinyl ethers, pentachlorophenyl vinyl ether, and the like.

Illustrative haloalkaryl vinyl ethers are the chloromethylphenyl vinyl ethers, the bromomethyl phenyl vinyl ethers, the chloroethylphenyl vinyl ethers, the bromoethylphenyl vinyl ethers, the chlorobutylphenyl vinyl ethers, the chloropropylphenyl vinyl ethers, the chloromethylnaphthyl vinyl ethers, and the like.

Illustrative nitroaryl vinyl ethers are 2,4-dinitrophenyl vinyl ether, the nitrophenyl vinyl ethers, the nitronaphthyl vinyl ethers, the dinitronaphthyl vinyl ethers, and the like.

The benzofurans contemplated herein contain the vinyloxy group in a five-membered heterocyclic ring which can be exemplified by 2-methyl-3-carbethoxy-5-hydroxy-benzofuran the structure of which is:

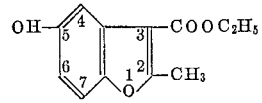

Also contemplated by the term "benzofuran" as used herein and in the appended claims are halogenated benzofurans and benzofuran-derived esters and salts thereof.

Illustrative benzofurans are the 5-hydroxy benzofurans such as 2-ethyl-3-carbethoxy-5-hydroxy-benzofuran, 2-methyl-3-carbethoxy-5-hydroxy-benzofuran, 2-n-propyl-3-carbethoxy-5-hydroxy-benzofuran, 4,6,7 - trimethyl-5-hydroxy-benzofuran, and the like; the chlorinated 5-hydroxy benzofurans such as 2-methyl-3-carbethoxy-4-chloro-5-hydroxy-benzofuran, 2-methyl-3-carbethoxy-4,6-dichloro-5 - hydroxy-benzofuran, 2-ethyl-3-carbethoxy-4-chloro-5-hydroxy-benzofuran, and the like; the brominated 5-hydroxy benzofurans such as 2-methyl-3-carbethoxy-4,6-dibromo-5-hydroxy-benzofuran, 2-n-propyl-3-carbethoxy-4-bromo-5-hydroxy-benzofuran, 2-n-propyl-3-carbethoxy-6-bromo-5-hydroxy-benzofuran, and the like; the salts of benzofuran-derived esters such as sodium salt of 2-methyl-3-carboxy-5-hydroxy-benzofuran ethyl ester, potassium salt of 2-ethyl-3-carboxy-5-hydroxy-benzofuran butyl ester, sodium salt of 2-n-propyl-3-carboxy-5-hydroxy-benzofuran ethyl ester, and the like.

The stimulation of growth is conveniently brought about by applying to the seeds, the plant, or particular parts of the plant the aforesaid stimulant compounds directly or along with a carrier such as water, ethanol, or water-ethanol mixtures. The buds of plants, leaves, or similar plant parts may be treated by a direct application of water, water-ethanol, or ethanol solutions in small volumes which would deposit upon evaporation or absorption from about 0.01 to about 3.5 micrograms of the growth-stimulating compounds per 10 to 20 square millimeters of plant surface. The preferred amount in such an instance is from about 0.05 to about 1.5 micrograms per 10 to 20 square millimeters of surface. Optimum results were observed with these amounts upon direct application.

The growth of a plant can also be stimulated by treatment with water, ethanol, or water-ethanol solutions of the stimulant compounds, the vinyloxy group concentration in the solution being in the range from about $10^{-2}$ to about $10^{-8}$ mole-equivalents per liter of solution. Vinyloxy group concentrations in excess of about $10^{-2}$ mole-equivalents per liter of solution were observed to produce no additional beneficial results nor an increase in growth stimulation. Vinyloxy group concentrations below about $10^{-8}$ mole-equivalents per liter of solution were found to be too low to effectively stimulate plant growth.

The growth stimulating compositions of the present invention may be applied directly to the plant by spraying, dipping, etc. The compositions may also be applied to the roots of the plant or to the soil or other growth media in the vicinity of the plant.

Either a single compound or a mixture of compounds containing a vinyloxy group may be employed for the purpose of growth stimulation.

Moreover, accessory factors such as nutrients (sources for N, P, S, etc.), trace elements, soluble carbohydrates, pesticidal compounds, and the like, may be admixed thereto. These accessory factors, of course, have to be non-toxic to the plant and must be chemically compatible with the stimulant compound containing the vinyloxy group.

The growth-stimulating effect achievable through the teachings of the present invention has been demonstrated with a great variety of plants including cucumber, bean, flax, corn, radish, lettuce, winter rye, alfalfa, tomato, duckweed (*Lemna minor*), and Coleus. The herein disclosed compounds are particularly effective for increasing germination and seedling growth rates, bud growth, leaf and stem growth, etc., thereby materially enhancing the vigor of plants which include species or varieties of economic value for food, for raw materials, as ornamentals, ground cover, or other uses.

In addition, the foregoing methods are not restricted to higher plants only, but are equally well suited to lower plants such as, for example, the green, flagellated microorganism Euglena, an alga, which when placed in solutions containing 0.01 to 0.10 micrograms per milliliter of 2-chloroethyl vinyl ether exhibited a two-fold to four-fold increase over the growth rate in standard culture solutions.

Similarly, the beneficial effects of the growth-stimulating methods may be extended to obligate anaerobic and facultative aerobic bacteria, various strains of which are employed in the manufacture of pharmaceutical preparations.

Presently obligate anaerobic bacteria are cultured in sealed, controlled-atmosphere vessels or under high vacuum because of their high oxygen sensitivity. By a treatment of these bacteria with compounds containing a vinyloxy group this oxygen sensitivity may be attenuated and the culturing carried out under less-demanding environmental conditions. By the same token, the growth of facultative aerobic bacteria may be enhanced by the application of the aforesaid growth stimulants.

The foregoing discussion will be augmented and further illustrated by the subsequent experimental examples which demonstrate the effectiveness of the plant-growth stimulation methods of this invention.

EXAMPLE 1

Common garden bean seedlings were grown for 10 days in ordinary potting soil. At the end of this time plants were separated in groups of 20–25 and the terminal bud was treated directly with 0.01 ml. of distilled water ("control") or 0.01 ml. of a solution or suitable stimulating compound in distilled water. Growth was measured regularly, and after 10 days the plants were harvested and their parts weighed and measured.

Representative treatment and harvest data are tabulated below:

Table I

INCREASED GROWTH AS A RESULT OF TREATMENT WITH 5-HYDROXY-BENZOFURANS

| Growth measurement | Control | 2-methyl-3-carboxy-5- hydroxy benzofuran | |
|---|---|---|---|
| | | Na salt (0.02 micrograms) | Ethyl ester (2.0 micrograms) |
| Stem length (cm.) | 8.5 | 10.1 | 11.6 |
| Stem weight (gm.) | 2.37 | 2.98 | 3.50 |
| 1st leaf area (cm.²) | 32.4 | 33.1 | 71.4 |
| 1st leaf wt. (gm.) | 0.35 | 0.43 | 0.63 |

The data in Table I illustrate the effectiveness of both the ethyl ester and the sodium salt of 2-methyl-3-carboxy-5-hydroxy benzofuran ethyl ester in stimulating stem and leaf growth.

Table I

INCREASED GROWTH AS A RESULT OF TREATMENT WITH SUBSTITUTED 5-HYDROXY BENZOFURANS

| Growth measurement | Control | 2-methyl-3-carbethoxy-5-hydroxy benzofuran | | |
|---|---|---|---|---|
| | | 6-bromo- (2.5 micrograms) | 4,6-dibromo-(3.5 micrograms) | 6-chloro- (2.0 micrograms) |
| Stem length (cm.) | 8.4 | 9.4 | 10.4 | 9.3 |
| Stem weight (gm.) | 2.11 | 2.24 | 2.48 | 2.34 |
| 1st leaf area (cm.²) | 15.0 | 21.2 | 25.8 | 18.0 |
| 1st leaf wt. (gm.) | 0.13 | 0.21 | 0.25 | 0.18 |

Table II shows that substantial increase in stem and growth was achieved after treatment with halogenated 5-hydroxy benzofurans as compared to the untreated plants.

EXAMPLE 2

Seeds of winter rye in groups of 33 were germinated in water solutions containing alkyl-carbalkoxy-hydroxy-halo-substituted benzofurans. After 15 hrs. at 25° C., germination percentages were computed and the results expressed as percentage increase attributable to the presence of the stimulant. After an additional 50 hours of incubation, root lengths were measured and the results computed as percentage increase over root length in water alone.

Seeds of Peruvian alfalfa were also used in the manner described for winter rye, except that the final growth measurements were made in terms of weights of whole seedlings rather than lengths of roots.

In the following table are summarized the results obtained with preferred concentrations of growth stimulants.

Table III

GROWTH STIMULATION OF RYE AND ALFALFA WITH HALOGENATED BENZOFURANS

| Compound | Concentration, moles/l. | Percentage increase over germination or growth in water alone | | | |
|---|---|---|---|---|---|
| | | Rye | | Alfalfa | |
| | | Germination | Growth | Germination | Growth |
| 2-methyl-3-carbethoxy-5-hydroxy-6-bromo-benzofuran | $10^{-6}$ | 92 | 128 | 90 | 32 |
| 2-methyl-3-carbethoxy-5-hydroxy-6-iodo-benzofuran | $10^{-6}$ | 100 | 72 | 40 | 32 |
| 2-methyl-3-carbethoxy-5-hydroxy-6-chloro-benzofuran | $10^{-5}$ | 100 | 50 | | |

The data in Table III are indicative of the substantially enhanced germination and growth of rye and alfalfa. In the case of rye, for example, germination has been increased by about 100 percent, and the growth has been increased by about 128 percent by the treatment.

EXAMPLE 3

Ten day old garden bean plants were treated with alkyl vinyl ethers and haloalkyl vinyl ethers by direct application to the terminal bud of 0.01 ml. water solutions of the desired compounds. Growth in length of the bud and bud products was followed daily for an additional 10 days, at which time the plants were harvested and the lengths and weights of plant parts determined. In the following table various results of the treatment employed are summarized.

Table IV

GROWTH STIMULATION WITH 2-CHLOROETHYL VINYL ETHER

| Total weight of compound applied to bud, micrograms | Growth response (in mm. length) at— | | |
|---|---|---|---|
| | 1 day after treatment | 2 days after treatment | 8 days after treatment |
| 0 | 0.5 | 2.5 | 36.5 |
| 0.01 | 1.6 | 6.2 | 46.5 |
| 1.00 | 2.4 | 8.2 | 48.0 |

Table IV shows the effectiveness of growth stimulation by various amounts of 2-chloroethyl vinyl ether applied to the terminal bud of the bean plant in an aqueous solution. In each instance the plants exhibited an increase in growth rate.

Table V
COMPARISON OF ALKYL VINYL ETHERS AND HALO-ALKYL VINYL ETHERS AS GROWTH STIMULANTS

| Compound | Total weight of compound applied, micrograms | Growth during 24 hrs. as percentage increase over growth without vinyl ether |
|---|---|---|
| Ethyl vinyl ether | 0.01 | 30 |
| 2-chloroethyl vinyl ether | 0.01 | 220 |
| n-butyl vinyl ether | 0.01 | 25 |
| Ethyl vinyl ether | 1.00 | 43 |
| 2-chloroethyl vinyl ether | 1.00 | 380 |
| n-Butyl vinyl ether | 1.00 | 10 |

Table V particularly points out the effectiveness of 2-chloroethyl vinyl ether as a growth stimulant. A growth increase of 220 percent during a twenty-four hour period was observed after the application of 0.01 microgram of the compound, and a growth increase of 380 percent was observed during the same time period when 1.00 microgram was applied.

EXAMPLE 4

Seeds of winter rye in groups of 33 were germinated in water or solutions containing substituted alkyl vinyl ethers. After 50 hrs. of incubation, the growth in weight and length of roots was measured. The results of these tests are summarized below:

Table VI
GROWTH STIMULATION WITH SUBSTITUTED ALKYL VINYL ETHERS

| Compound | Concentration, moles/l. | Ave. Number of roots/plant | Ave. length, mm. | Ave. wt., mg. |
|---|---|---|---|---|
| Pentachlorophenyl vinyl ether | $4 \times 10^{-4}$ | 2.2 | 16.9 | 189 |
| 2,4-dinitrophenyl vinyl ether | $4 \times 10^{-4}$ | 1.9 | 19.7 | 258 |
| 4-methylphenyl vinyl ether | $1 \times 10^{-5}$ | 1.9 | 11.8 | 189 |
| 4-methylphenyl vinyl ether | $1 \times 10^{-4}$ | 2.3 | 19.9 | 274 |
| Control (water only) | | 1.5 | 11.2 | 141 |

Table VI illustrates the effectiveness of various representative vinyl ethers in stimulating the germination of winter rye. The average number of roots per plant, their average length, and their average weight increased after the treatment with the vinyl ethers.

EXAMPLE 5

Narcissus bulbs in groups of five were placed in tap water solutions of substituted alkyl vinyl ethers having a vinyloxy group concentration of about $10^{-6}$ mole-equivalents per liter. The number of roots formed after 1, 2, and 4 days was observed and recorded. The experimental results are summarized in Table VII below.

Table VII
STIMULATION OF ROOTING OF NARCISSUS BULBS

| Substituted alkyl vinyl ether | No. of roots after— | | |
|---|---|---|---|
| | 1 day | 2 days | 4 days |
| Untreated (Control) | 0 | 0 | 52 |
| 2-[N-methyl-N-(2'-hydroxyethyl)]-ethyl vinyl ether | 12 | 23 | 143 |
| 2-(S-methyl)-ethyl vinyl ether | 0 | 11 | 161 |
| 2-(S-n-octyl)-ethyl vinyl ether | 2 | 29 | 162 |
| 2-(S-n-dodecyl)-ethyl vinyl ether | 3 | 19 | 178 |

The above data indicate that the substituted alkyl vinyl ethers provide a generally good rooting stimulation. Particular effectiveness is exhibited by 2-(S-n-dodecyl)-ethyl vinyl ether and 2-(S-methyl)-ethyl vinyl ether.

EXAMPLE 6

Yellow onion bulbs in groups of five were placed in aqueous solutions of substituted alkyl vinyl ethers having a vinyloxy group concentration of about $10^{-6}$ mole-equivalents per liter. The bulbs were placed so that the entire undersurface of the bulb was immersed in the solution. The number of roots appearing after 3 days and 10 days was observed and recorded. The total fresh weight yield of roots per five bulbs was also determined on the 10th day.

The resulting data demonstrating the stimulating effect are compiled in Table VIII below.

Table VIII
STIMULATION OF ROOTING OF ONION BULBS

| Substituted alkyl | Number of roots/5 bulbs after— | | Root wt., gms./5 bulbs after 10 days |
|---|---|---|---|
| | 3 days | 10 days | |
| Untreated (Control) | 11 | 76 | 0.95 |
| 2-(2,4-dichlorophenoxy)-ethyl vinyl ether | 12 | 153 | 2.00 |
| 7-hydroxy-3-oxy-heptyl vinyl ether | 7 | 131 | 1.82 |
| 2-(S-methyl)-ethyl vinyl ether | 8 | 156 | 2.78 |
| 2-(S-n-octyl) ethyl vinyl ether | 10 | 121 | 3.19 |
| 2-chloroethyl vinyl ether | 6 | 105 | 1.91 |
| 1:1 mixture of 2-chloroethyl vinyl ether and 2-(S-methyl)-ethyl vinyl ether | 13 | 111 | 1.41 |
| 1:1 mixture of 2-chloroethyl vinyl ether and 2-(S-n-octyl)-ethyl vinyl ether | 94 | 194 | 3.21 |

The above table also indicates that a synergistic effect with respect to early rooting is obtained by a mixture of equal parts of 2-chloroethyl vinyl ether and 2-(S-n-octyl)-ethyl vinyl ether in the solution.

EXAMPLE 7

Cuttings of the ornamental plant, Coleus, about 10 cm. long, were immersed in groups of five in an aqueous solution of substituted alkyl vinyl ethers having a vinyloxy group concentration of about $10^{-6}$ mole-equivalents per liter. The number of roots per five cuttings were determined on the 6th and 7th days, and the root lengths on the 10th day. The experimental results are tabulated below in Table IX.

Table IX
STIMULATION OF ROOTING OF COLEUS CUTTINGS

| Substituted alkyl | No. Roots/5 cuttings after | | Root length (cm.) after 10 days | |
|---|---|---|---|---|
| | 6 days | 7 days | Longest | Average |
| Untreated (Control) | 4 | 32 | 0.25 | 0.14 |
| 2-[N-methyl-N-(2'-hydroxyethyl)]-ethyl vinyl ether | 3 | 45 | 2.75 | 1.67 |
| 2-(S-methyl)-ethyl vinyl ether | 6 | 40 | 2.19 | 1.41 |
| 2-(S-n-octyl)-ethyl vinyl ether | 8 | 41 | 1.85 | 1.22 |
| 2-(S-n-dodecyl)-ethyl vinyl ether | 9 | 33 | 2.87 | 1.86 |

The above table indicates that the formation of roots from stem cuttings can be stimulated by the methods of the present invention.

EXAMPLE 8

In a manner analogous to Example 6, yellow onion bulbs were treated with derivatives of 2-methyl-3-carbethoxy-5-hydroxybenzofuran. The number of roots per five bulbs was determined after four days and eleven days. Root length and root weight per five bulbs was determined after 11 days. The experimental results are tabulated below in Table X.

Table X

STIMULATION OF ROOTING OF ONION BULBS WITH SUBSTITUTED 2-METHYL-3-CARBETHOXY-5-HYDROXY-BENZOFURANS

| Substituted benzofuran | Roots/5 bulbs after— | | Root length, cm, 11 days | Root wt./ 5 bulbs, gm, 11 days |
|---|---|---|---|---|
| | 4 days | 11 days | | |
| Untreated (Control) | 5 | 101 | 4.6 | 0.96 |
| 2-methyl-3-carbethoxy-5-hydroxy-benzofuran | 39 | 174 | 5.7 | 3.01 |
| 2-methyl-3-carbethoxy-5-hydroxy-6-bromo-benzofuran | 6 | 144 | 7.0 | 1.99 |
| 2-methyl-3-carbethoxy-5-hydroxy-6-iodo-benzofuran | 15 | 67 | 8.0 | 1.41 |
| 2-methyl-3-carbethoxy-5-methoxy-benzofuran | 15 | 153 | 10.4 | 3.42 |
| 2-methyl-3-carbethoxy-5-methoxy-6-bromo-benzofuran | 17 | 120 | 6.8 | 1.44 |

EXAMPLE 9

Derivatives of 2-methyl-3-carbethoxy-5-hydroxy-benzofurans in an aqueous solution were applied directly to the terminal buds of 10-day-old Black Valentine beans. Each terminal bud was treated with 0.01 milliliter of solution containing either 0.01 to 1.0 microgram of the stimulant compound.

The increase in primary leaf area over initial values and the area of the first trifoliate leaf, the latter being absent at the time of the treatment with the stimulant, were measured after two weeks. The experimental results are tabulated below in Table XI.

Table XI

EFFECTS OF SUBSTITUTED 2-METHYL-3-CARBETHOXY-5 HYDROXY-BENZOFURANS ON BEAN LEAF EXPANSION

| Substituted benzofuran | Amt. applied to bud, gms. | Leaf area increase, cm.$^2$ in 2 weeks | |
|---|---|---|---|
| | | Primary leaves | 1st trifoliate leaf |
| Untreated (Control) | | 8.4 | 4.5 |
| 2-methyl-3-carbethoxy-4-methoxy-6-bromo-benzofuran | 1.0 | 20.1 | 18.7 |
| 2-methyl-3-carbethoxy-4,6-bromo-5-methoxy-benzofuran | 0.01 | 18.7 | 6.3 |
| 2-methyl-3-carbethoxy-5-methoxy-6-iodo-benzofuran | 0.01 | 13.8 | 3.6 |
| 2-methyl-3-carbethoxy-4,6-chloro-benzofuran | 0.01 | 20.1 | 11.1 |
| 2-methyl-3-carbethoxy-4,6-chloro-benzofuran | 1.0 | 2.64 | 18.9 |

The foregoing results indicate that primary leaf growth was stimulated by every compound tested and that trifoliate leaf growth was stimulated by all but 2-methyl-3-carbethoxy-5-methoxy-6-iodo-benzofuran.

EXAMPLE 10

Three-week-old Black Valentine bean plants were treated in groups of 20-30 with substituted alkyl vinyl ethers. About 0.01 milliliter of an aqueous solution containing about $10^{-2}$ mole-equivalents of vinyloxy groups per liter was applied directly to the bud of the plant. The number of flower buds and flowers were determined and growth measurements taken after one week. The experimental results are summarized in Table XII below.

Table XII

EFFECTS OF VINYL ETHER DERIVATIVES ON FLOWERING OF BLACK VALENTINE BEANS

| Stimulant compound | Leaf area increase, cm.$^2$, after 1 week | Percentage of plants flowering after 1 week | | |
|---|---|---|---|---|
| | | Buds | Open flowers | Sum |
| None (Control) | 4.2 | 5 | 5 | 10 |
| (a) Aryloxy alkyl vinyl ethers: | | | | |
| 2-(2,4-dichlorophenoxy)-ethyl vinyl ether | 5.7 | 0 | 15 | 15 |
| 2-(2,3,5-trichlorophenoxy)-ethyl vinyl ether | 6.1 | 29 | 5 | 34 |
| 2-(3,5-dimethoxyphenoxy)-ethyl vinyl ether | 1.5 | 18 | 5 | 23 |
| (b) Hydroxyalkoxyalkyl vinyl ethers: | | | | |
| 11-hydroxy-3,6,9-trioxy-undecyl vinyl ether | 8.6 | 12 | 12 | 24 |
| 5-hydroxyl-3-oxy-hexyl vinyl ether | 9.5 | 33 | 5 | 38 |
| 5-hydroxy-3-oxy-4-methyl-hexyl vinyl ether | 8.1 | 31 | 0 | 31 |
| 7-hydroxy-3-oxy-heptyl vinyl ether | 8.4 | 42 | 14 | 56 |
| (c) S and N containing substituted alkyl vinyl ethers: | | | | |
| 2-(S-n-propyl)-ethyl vinyl ether | 4.8 | 30 | 4 | 34 |
| 2-(S-n-octyl)-ethyl vinyl ether | 5.7 | 36 | 9 | 45 |
| 2-(S-phenyl)-ethyl vinyl ether | 3.7 | 22 | 4 | 26 |
| 2-[2'-(N,N-diethylamino) ethoxy]-ethyl vinyl ether | 12.8 | 15 | 20 | 35 |
| 2-[S-(2'-cyanoethoxy)-ethyl]-ethyl vinyl ether | 3.7 | 22 | 0 | 22 |

The above table illustrates the wide variety of stimulant compounds that promote flowering in Black Valentine beans. Particularly effective for this purpose appear to be 7-hydroxy-3-oxy-heptyl vinyl ether and 2(S-n-octyl)-ethyl vinyl ether.

EXAMPLE 11

Three-week-old Black Valentine bean plants were treated in groups of 20-30 with substituted alkyl vinyl ethers. About 0.01 milliliter of an aqueous solution containing about $10^{-4}$ mole-equivalents of vinyloxy groups per liter was applied directly to the bud of the plant. The plants were then left undisturbed at flowering but were harvested for the crop of young pods after three weeks.

The observed results are compiled in Table XIII below.

Table XIII

STIMULATION OF FRUITING IN BLACK VALENTINE BEANS

| Fruiting stimulant | Fruiting after 3 weeks | | |
|---|---|---|---|
| | Fresh wt. of pods, gm./20 plants | Fresh wt., mgm./pod | Length, mm./pod |
| None (Control) | 2.63 | 90 | 21 |
| 2-(2,4-dichlorophenoxy) ethyl vinyl ether | 4.29 | 180 | 32 |
| 2-(2,4,5-trichlorophenoxy)-ethyl viny ether | 3.42 | 210 | 37 |
| 5-hydroxy-4-methyl-3-oxy-hexyl vinyl ether | 4.94 | 300 | 43 |
| 2-(S-n-propyl)ethyl vinyl ether | 8.92 | 320 | 40 |
| 2-(S-n-dodecyl)ethyl vinyl ether | 4.26 | 310 | 41 |

The results in the above table indicate that both overall pod yield and average pod yield can be enhanced by the methods of the present invention. Particularly effective fruiting stimulant in this respect appears to be 2-(S-n-propyl)-ethyl vinyl ether.

EXAMPLE 12

Bulbs of the ornamental, narcissus, were immersed in aqueous growth stimulant solutions having a vinyloxy group concentration of about $10^{-6}$ mole-equivalents per liter. The bulbs were immersed so that the entire bottom surface was contacted by the solution and were maintained under room lighting conditions and at about 70° F.

Experimental observations included the noting of the number of roots after 2 days and 4 days, the length of the flower stalk after 7 days, and the number of bulbs flowering after 10 days. The data are compiled in Table XIV below.

*Table XIV*

STIMULATION OF NARCISSUS BULB DEVELOPMENT

| Stimulant compound | Roots/5 bulbs after— | | Flower stalk, cm. after 7 days | Bulbs flowering per 5, after 10 days |
|---|---|---|---|---|
| | 2 days | 4 days | | |
| Untreated (Control) | 0 | 52 | 4.2 | |
| 2-[N-methyl-N-(2'-hydroxyethyl)]-ethyl vinyl ether | 23 | 143 | 6.4 | |
| 2-(S-methyl)-ethyl vinyl ether | 11 | 161 | 6.4 | |
| 2-(S-n-octyl)-ethyl vinyl ether | 29 | 102 | 7.7 | 2 |
| 2-(S-n-dodecyl)-ethyl vinyl ether | 19 | 178 | 8.6 | 1 |

The above data indicate that both the root and floral structure development can be enhanced through the use of the methods of the present invention. Particularly suitable for this purpose are the substituted alkyl vinyl ethers.

EXAMPLE 13

One-month-old Manalucie tomato plants were sprayed with a $10^{-4}$ M aqueous solution of selected growth stimulants. The flowering and fruiting of the sprayed plants one week after spraying was observed. The results are compiled in Table XV below.

*Table XV*

SIMULATION OF FLOWERING AND FRUITING IN TOMATO PLANTS

| Stimulant compound | Floral structure per ten plants | | | | |
|---|---|---|---|---|---|
| | Flower buds | Flowers open | Fruit developing | Sum | Percentage past bud stage |
| None (Control) | 17 | 3 | 0 | 20 | 15 |
| 5-hydroxy-3-oxy-hexyl vinyl ether | 18 | 27 | 0 | 45 | 60 |
| 7-Hydroxy-3-oxy-heptyl vinyl ether | 33 | 7 | 0 | 40 | 18 |
| 2-[2'-(N, N-diethyl-amino-) ethoxy]-ethyl vinyl ether | 30 | 17 | 3 | 50 | 40 |
| 2-(S-n-propyl)-ethyl vinyl ether | 17 | 13 | 0 | 30 | 43 |
| 2-(S-n-octyl)-ethyl vinyl ether | 50 | 0 | 3 | 53 | 3 |

The foregoing table indicates that the substituted alkyl vinyl ethers generally promote the rate of flower bud development into flowers and fruit in tomato plants. Particularly effective for bud production in number is 2-(S-n-octyl)-ethyl vinyl ether.

EXAMPLE 14

The terminal bud of Coleus, an ornamental, was treated with $10^{-7}$ moles of a substituted alkyl vinyl ether applied directly to the bud. Two weeks after the treatment the plants were examined for the presence of a flower spike. The experimental results are compiled below in Table XVI.

*Table XVI*

STIMULATION OF TERMINAL INFLORESCENCE IN COLEUS

| Stimulant compound | Number of plants/10 showing a flower spike 2 weeks after treatment |
|---|---|
| None (Control) | 0 |
| 5-hydroxy-3-oxy-hexyl vinyl ether | 5 |
| 7-hydroxy-3-oxy-heptyl vinyl ether | 4 |
| 2-[2'-(N, N-diethylamino-) ethoxy]-ethyl vinyl ether | 2 |
| 2-(S-n-propyl)-ethyl vinyl ether | 2 |
| 2-(S-n-octyl)-ethyl vinyl ether | 5 |

The above data indicate that the substituted alkyl vinyl ethers are effective flowering stimulants for Coleus. Optimum results were obtained with 2-(S-n-octyl)-ethyl vinyl ether and 5-hydroxy-3-oxy-hexyl vinyl ether.

The plant growth stimulating methods discussed herein with specific reference to particular vinyloxy-group-containing compounds may also be practiced with analogous compounds which comprise a vinyl or vinylene group attached to an oxygen analogue such as sulfur and nitrogen.

The foregoing discussion and the accompanying examples are intended to be illustrative of the present invention but are not to be construed as limitations thereof. Other embodiments within the spirit and scope of the present invention will readily present themselves to one skilled in the art.

I claim:

1. Method for stimulating growth of a plant which comprises applying thereto in an amount sufficient to enhance the rate of development of at least a portion of said plant an organic compound which is:
    (1) stable in acidic media;
    (2) characterized by the presence of a vinyloxy group; and
    (3) contains up to 18 carbon atoms and is selected from the group consisting of an alkyl vinyl ether, a substituted alkyl vinyl ether, an aryl vinyl ether, a substituted aryl vinyl ether, and a benzofuran;
    said substituted alkyl vinyl ether being a member of the group consisting of aralkyl vinyl ether, haloalkyl vinyl ether, haloaralkyl vinyl ether, alkoxyalkyl vinyl ether, alkthioalkyl vinyl ether, arylthioalkyl vinyl ether, dialkaminoalkoxyalkyl vinyl ether, and hydroxyalkoxyalkyl vinyl ether; and
    said substituted aryl vinyl ether being a member of the group consisting of alkaryl vinyl ether, haloaryl vinyl ether, haloalkaryl vinyl ether, and nitroaryl vinyl ether.

2. Method for stimulating growth of a plant which comprises applying thereto in an amount sufficient to enhance the development of at least a portion of said plant an aqueous solution of an alkyl vinyl ether having less than eight carbon atoms in the alkyl radical; said alkyl vinyl ether being present in said solution in an amount sufficient to provide a vinyloxy group concentration in the range from about $10^{-2}$ to about $10^{-8}$ mole-equivalents per liter of solution.

3. The method in accordance with claim 2 wherein the alkyl vinyl ether is ethyl vinyl ether.

4. The method in accordance with claim 2 wherein the alkyl vinyl ether is n-butyl vinyl ether.

5. Method for stimulating growth of a plant which comprises applying thereto in an amount sufficient to enhance the development of at least a portion of said plant an aqueous solution of a haloalkyl vinyl ether having less than eight carbon atoms in the haloalkyl radical; said haloalkyl vinyl ether being present in said solution in an amount sufficient to provide a vinyloxy group concentration in the range from about $10^{-2}$ to about $10^{-8}$ mole-equivalents per liter of solution.

6. The method in accordance with claim 5 wherein the haloalkyl vinyl ether is 2-chloroethyl vinyl ether.

7. The method in accordance with claim 5 wherein the haloalkyl vinyl ether is 2-bromoethyl vinyl ether.

8. Method for promoting flowering of a plant which comprises applying thereto in an amount sufficient to enhance the development of flowers an aqueous solution of an alkthioalkyl vinyl ether having up to 18 carbon atoms in the alkthioalkyl radical; said alkthioalkyl vinyl ether being present in said solution in an amount sufficient to provide a vinyloxy group concentration in the range from about $10^{-2}$ to about $10^{-8}$ mole-equivalents per liter of solution.

9. The method in accordance with claim 8 wherein the alkthioalkyl vinyl ether is 2-(S-n-octyl)ethyl vinyl ether.

10. Method for promoting flowering of a plant which comprises applying thereto in an amount sufficient to enhance the development of flowers an aqueous solution of a dialkaminoalkoxyalkyl vinyl ether having up to 18 carbon atoms in the dialkaminoalkoxyalkyl radical; said dialkaminoalkoxyalkyl vinyl ether being present in said solution in an amount sufficient to provide a vinyloxy group concentration in the range from about $10^{-2}$ to about $10^{-8}$ mole-equivalents per liter of solution.

11. The method in accordance with claim 10 wherein the dialkaminoalkoxyalkyl vinyl ether is 2-[2'-(N,N-diethylamino)ethoxy]ethyl vinyl ether.

12. Method for promoting flowering of a plant which comprises applying thereto in an amount sufficient to enhance the development of flowers an aqueous solution of a hydroxyalkoxyalkyl vinyl ether having up to 18 carbon atoms in the hydroxyalkoxyalkyl radical; said hydroxyalkoxyalkyl vinyl ether being present in said solution in an amount sufficient to provide a vinyloxy group concentration in the range from about $10^{-2}$ to about $10^{-8}$ mole-equivalents per liter of solution.

13. The method in accordance with claim 12 wherein the hydroxyalkoxyalkyl vinyl ether is 7-hydroxy-3-oxy-heptyl vinyl ether.

14. Method for promoting germination of a seed which comprises applying thereto in an amount sufficient to enhance said germination an aqueous solution of an alkyl vinyl ether having less than eight carbon atoms in the alkyl radical; said alkyl vinyl ether being present in said solution in an amount sufficient to provide a vinyloxy group concentration in the range from about $10^{-2}$ to about $10^{-8}$ mole-equivalents per liter of solution.

15. Method for promoting germination of a seed which comprises applying thereto in an amount sufficient to enhance said germination an aqueous solution of an alkyl-carbalkoxy-hydroxy-halo-substituted benzofuran having up to 18 carbon atoms; said benzofuran being present in said solution in an amount sufficient to provide a vinyloxy group concentration in the range from about $10^{-2}$ to about $10^{-8}$ mole-equivalents per liter of solution.

References Cited by the Examiner

UNITED STATES PATENTS

| | | | |
|---|---|---|---|
| 2,603,560 | 7/1952 | Stewart | 71—2.3 |
| 2,694,696 | 11/1954 | Melamed | 71—2.3 |
| 3,131,166 | 4/1964 | Harris et al. | 41—2.3 X |

LEWIS GOTTS, *Primary Examiner.*

JULIAN S. LEVITT, *Examiner.*